US012072698B2

(12) United States Patent
Mujica et al.

(10) Patent No.: US 12,072,698 B2
(45) Date of Patent: Aug. 27, 2024

(54) INSTANT POWER FAILURE DETECTION METHOD AND APPARATUS TO DISCARD POWER FAILURE AS CASE SCENARIO IN FLARE SYSTEMS DESIGN

(71) Applicant: Saudi Arabian Oil Company, Dhahran (SA)

(72) Inventors: Pedro Alejandro Mujica, Dhahran (SA); Herman Roberto Cipriano, Dhahran (SA); Ricardo Jose Guerra Castillo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 460 days.

(21) Appl. No.: 17/240,753

(22) Filed: Apr. 26, 2021

(65) Prior Publication Data
US 2022/0342412 A1   Oct. 27, 2022

(51) Int. Cl.
G05B 23/02   (2006.01)

(52) U.S. Cl.
CPC ..... G05B 23/0291 (2013.01); G05B 23/0275 (2013.01); G05B 23/0294 (2013.01)

(58) Field of Classification Search
CPC ............ G05B 23/0291; G05B 23/0275; G05B 23/0294
See application file for complete search history.

(56) References Cited

U.S. PATENT DOCUMENTS 5,982,120 A  * 11/1999  Akiyama ............. G11B 15/688
                                                          318/434
8,248,743 B2     8/2012  Priel et al.
(Continued)

FOREIGN PATENT DOCUMENTS

| CN | 105022893 A | * 11/2015 | ............ G06F 17/50 |
| JP | H0646528 | * 2/1994 | ............ Y04S 10/20 |

OTHER PUBLICATIONS

Lee et al , (Study of Flare Load Reduction by a Safety Instrumented System based on a High Integrity Protection System), Dec. 2013, pp. 393-400 downloaded from https://aiche.onlinelibrary.wiley.com/doi/full/10.1002/prs.11608 (Year: 2013).*

(Continued)

Primary Examiner — Robert E Fennema
Assistant Examiner — Olvin Lopez Alvarez
(74) Attorney, Agent, or Firm — Fish & Richardson P.C.

(57) ABSTRACT

Systems, methods and apparatus include a computer-implemented method that performs the following. First inputs are received from a first monitoring of the main power distribution system (MPDS) at a safety instrumented system (SIS) logic solver. The first inputs include power status information for equipment monitored by a main distribution switchgears (MDS). A second input is received at the SIS logic solver, from a second monitoring of the MPDS. The second input includes power status information for equipment monitored by a motor control center (MCC). SIS logic solver logic in the SIS logic solver is executed by the SIS logic solver using at least one of the first and second MPDS inputs. Upon confirmation of a power failure in the MPDS detected instantly by MDS or MCC functional safety capable controllers, the SIS logic solver logic generates an output signal to cut an incoming feed to processing plants, leading to discard power failure as a worst credible design case scenario for flare and disposal relief systems, the worst credible design case scenario caused by at least one of the first inputs and the second inputs.

15 Claims, 7 Drawing Sheets

(56) References Cited

U.S. PATENT DOCUMENTS

| | | | | |
|---|---|---|---|---|
| 10,162,695 | B2* | 12/2018 | Hashimoto | G06F 11/0772 |
| 2008/0079436 | A1* | 4/2008 | Gollhardt | H02B 13/025 |
| | | | | 324/530 |
| 2008/0156077 | A1* | 7/2008 | Flanders | F17D 5/00 |
| | | | | 700/282 |
| 2010/0100251 | A1* | 4/2010 | Chao | G21D 3/001 |
| | | | | 700/292 |
| 2013/0306322 | A1* | 11/2013 | Sanborn | E21B 43/2607 |
| | | | | 166/308.1 |
| 2018/0245452 | A1* | 8/2018 | Mujica | E21B 34/16 |
| 2019/0227581 | A1* | 7/2019 | Lewis | G05D 21/02 |
| 2022/0068111 | A1* | 3/2022 | Wang | H02J 9/061 |

OTHER PUBLICATIONS

Jahanian et al, "Failure Mode Reasoning in Model Based Safety Analysis" 2020, pp. 1-15, downloaded from https://arxiv.org/abs/2005.06279 (Year: 2020).*

Goyal, "Impact of Emergency Shutdown Devices on Relief System Sizing and Design", 2014, pp. 1-16, downloaded from https://onepetro.org/SPEMEHS/proceedings/13MEHS/All-13MEHS/SPE-170346-MS/210432 (Year: 2014).*

Alfraj, "Implementing Hips System in High Pressure Offshore Gas Producing Facilities", 2017, pp. 1-11 downloaded from https://onepetro.org/SPEMEOS/proceedings/17MEOS/4-17MEOS/D041S038R004/453576 (Year: 2017).*

Bouman et al, "MCC for Sil-Rated Applications", 2014, pp. 7, downloaded from https://ieeexplore.ieee.org/document/6900064 (Year: 2014).*

Harmon, "Critical Function Monitoring System Algorithm Development", 1984, pp. 862-867, downloaded from https://ieeexplore.ieee.org/document/4333384 (Year: 1984).*

Oliveira Costa et al, "Electrical Power Quality and the Challenges Faced by Power Assemblies Applications in Petrochemical industry", 2016, pp. 4495-4502, downloaded from https://ieeexplore.ieee.org/stamp/stamp.jsp?arnumber=7479574 (Year: 2016).*

Electrical engineering, "Switchgear vs. power distribution center (PDC) vs. motorcontrol center (MCC)—what's the difference", 2014, p. 5, downloaded from Switchgear vs. power distribution center (PDC) vs. motorcontrol center (MCC)—what's the difference (Year: 2014).*

PTC.com, "fault tree example", 2024 pp. 2, downloaded from https://support.ptc.com/help/wrr/r12.0.2.0/en/index.html#page/wrr/PractitionersGuide/FaultTreeExample.html (Year: 2024).*

* cited by examiner

INSTANT POWER FAILURE DETECTION METHOD AND APPARATUS TO DISCARD POWER FAILURE AS CASE SCENARIO IN FLARE SYSTEMS DESIGN

TECHNICAL FIELD

The present disclosure applies to flare and relief system design and power failure detection methods.

BACKGROUND

Potential electrical power failures can be a main consideration in the sizing of relief and flare system design in onshore, offshore, downstream, midstream or upstream systems, such as in the hydrocarbon producing oil and gas industries, including but not limited to applications in refining and petrochemical processing facilities. Electrical power failures may be experienced locally (partial), or globally (total) in, for example, a hydrocarbon processing facility. Conventional flare and relief system designs typically do not include techniques for early power failure detection as a leading indicator. Early power failure detection of any type (either partial or total) can prevent the escalation into a hazardous over pressure relief scenario, which can also be a determining factor in the sizing requirements in the design for flare and relief systems.

Commercially available electrical distribution controller devices do not serve as sensing elements for generating reliable and functional safety capable sensing elements (inputs) for a safety instrumented system (SIS), such as an emergency shutdown system (ESD) or high integrity protection systems (HIPS). Electrical distribution controllers are not designed for this purpose. Instead they are designed and used with electrical safety in mind as opposed to functional safety objectives, to alarm and disconnect power load to protect the electrical components in case of an electrical anomaly is detected in the distribution system, but without considering the protection of process equipment. Moreover, the controllers are not certified under functional safety requirements, such as International Electrotechnical Commission (IEC)-61511 and 61508.

SUMMARY

The present disclosure describes techniques that can be used for early, instant power failure detection methods, specifically to conceived to eliminate all types of power failure scenarios from the flare and relief system design, considered by conventional design methods to be worst credible case scenarios dictating larger sizing of the flare and relief system. In some implementations, a computer-implemented method includes the following. First inputs are received from a first monitoring of the main power distribution system (MPDS) at a safety instrumented system (SIS) logic solver. The first inputs include, for example power status information for equipment monitored by a main distribution switchgears (MDS). A second input is received at the SIS logic solver, from a second monitoring of the MPDS. The second input includes, for example power status information for equipment monitored by a motor control center (MCC). The logic is executed by the SIS logic solver using at least one of the first and second MPDS inputs. The SIS logic solver logic generates an output signal to cut an incoming mass flow process feed to processing plants, leading to discarding power failure as a worst credible design case scenario for flare and disposal relief systems, the worst credible design case scenario caused by at least one of the first inputs and the second inputs.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Improvements can be made over conventional relief system design for processing plants. In conventional systems, power failure scenarios can compromise the safety of an operating facility, relying in the proper sizing and availability of flare and relief systems to preserve and guarantee the safety of the associated operating plants and consequently the well-being of personnel, the assets, reputation and the environment. Use of the techniques of the present disclosure discard power failures as design worst case scenarios, that can substantially reduce sizing requirements of disposal flare and relief systems, worst case scenarios are no longer driven by the large relief associated with power failure cases. For example, the techniques, methods and apparatus eliminate the need to over-sized flare systems designed to account for large relief quantities linked to power failure scenarios when ascertained to be worst design case. The techniques can simultaneously fulfil requirements in electrical safety and industrial process functional safety in the design of electrical hardware such as power distribution controllers. Resulting flare and relief designs lead to a reduction of greenhouse gas emissions by reducing the hydrocarbon energy that is otherwise vented and burned to the atmosphere during real relieving events. This provides an economical benefit while conserving the product in the processing system for further processing, in addition to providing capital savings due to reduced sizing of components conforming the design of the flare and relief system. Such designs can lead to preventative measures, including the leading, preventative, and instant detection and mitigation of consequences caused by power failures that may otherwise become worst case scenarios for a flare and relief system design. This can relieve/reduce flare and relief system capacity sizing requirements, which in a leading approach can instantly detect power failure events, and proactively actuate safety instrumented systems (SIS), such as emergency shutdown (ESD) systems or high integrity protection systems (HIPS) to cut the flow mass input to the processing units, preventing undesired over pressurizations events. The techniques provide a faster, reliable, and functionally safety capable ways of directly detecting power failure scenarios to prevent over pressure in the downstream system being protected. This can be accomplished by connecting electrical circuitry elements directly with process automation systems elements to protect processing plants from over-pressure scenarios and to optimize flare and relief system sizing capacities. The use of early and leading actions provided by the system enables a reduction of the typical oversizing of relief and flare systems associated with electrical power failures, which no longer is the worst credible design case for the flare and relief system. As a result, power failures no longer serve as the root cause of an overpressure event. Also, the power failures are no longer the determining design case scenarios, enabling a reduction in flare sizing, greenhouse emissions, and offering a capital expenditures (CAPEX) and operating expenses (OPEX) economical advantage due to the optimized design. Also, an opportunity is provided to increment the capacity of existing facilities, for example, hydrocarbon processing plants without impacting the relief capacity requirements, while maintaining the same flare system design by mitigation or elimination of the power failure as an initiating event for overpressure scenarios. The techniques can eliminate the source of high pressure (energy) as a leading, proactive and preventative indicator and can provide a faster way of detecting and eliminating the worst case scenarios, for example power failure, which can swiftly cut the flow mass input into processing units, avoiding the need to relieve material to the flare, hence debottlenecking the flare and relief system avoiding the need to increase the flare and relief sizing and capacity while incrementing and expanding production. An added benefit is the reduction of carbon dioxide due to fewer events prompting burned hydrocarbon into the atmosphere, also reducing operational OPEX cost due to less purge gas being required for reduced or smaller flare and relief system operational needs.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques that can be used for instant power failure detection methods, specifically to account for a variety of credible power failure scenarios. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

This present disclosure describes improved techniques for discarding power failure cases as valid credible worst case scenarios dictating and imposing the design of relief disposal and flare systems. The techniques can include the use of an apparatus that is distinctively designed as a functional safety capable electrical controller. The techniques can also influence the design of non-functional safety electrical controllers.

Typical double-ended switchgears that supply power to critical plants include fully programmable controller devices that are installed to perform control and electrical protection. However, design features of such devices are not suitable for functional safety protection purposes such as safety instrumented systems (SIS) commonly referred to as emergency shutdown (ESD) system or high-integrity protection systems (HIPS). Techniques of the present disclosure can be used to provide power failure instant detection as a leading and forecasting indicator (as opposed to a lagging response). The detection can occur on electrical distribution systems, such as switchgears, using monitoring power system healthiness to feed inputs (for example, as sensing elements) to a SIS or become an integral component to the SIS within the SIS itself. For example, the functional safety certified electrical controller can become the logic solver component within either an emergency shutdown (ESD) system or a HIPS. Doing so can eliminate the need to relieve large flow mass rates of hydrocarbons to the flare and disposal relief system due to instant detection of the failure in the power distribution system and isolating incoming process feeders into a processing plant if and every time a power failure occurs.

Typical approved electrical controller devices are neither designed nor certified per functional safety requirements, for example, under International Electrotechnical Commission (IEC)-61511 and IEC-61508. Techniques of the present disclosure can include methods and an apparatus for providing an improvement over conventional systems. For example, the techniques can be used to change or improve conventional ways of detecting hazardous conditions by making the electrical distribution controller a functional safety capable device that, when coupled with SIS (ESD or HIPS), can eliminate hazardous scenarios in such a way that electrical power failure (in its multiple forms partial or total) is no longer considered the worst case scenario in the design of a flare and disposal relief system. The electrical controller's architecture can be designed to comply with functional safety requirements in IEC-61511 and IEC-61508. Existing non-functional safety certified electrical controllers can undergo a functional safety certification process or a proven/prior use concept could be applied, which can expand the technical features of such electrical devices to make them suitable for functional safety applications.

Use of the techniques of the present disclosure can identify early and reliable detection of electrical power failure by using a system for monitoring all electrical equipment supplying power to critical processes and plants, such as double-ended switchgears. Upon detection of a confirmed anomaly in the power system, the system can either execute safety protocol itself or command initiation of a process trip. Alternatively, the system can be used as a sensing element to generate a reliable signal used as an input to a separate safety logic solver belonging to a separate process SIS. The logic solver can trigger the actuation of final elements, isolating the process (for example, the closure of valves), avoiding over-pressurization, and reaching a safe state by proactively stopping the introduction of feed into the processing plants.

Implementations of the present disclosure can include, for example, a set of voltage transformer devices connected to a functional safety capable switchgear electrical distribution controller device (for example, double-ended) acting as sensing element (following functional safety requirements) coupled with the ESD or HIPS to trigger a process trip (for example, isolating of final elements—valves of incoming process feeders). The electrical controllers can be granted certification in compliance with the functional safety applicable standards.

Figure 1:
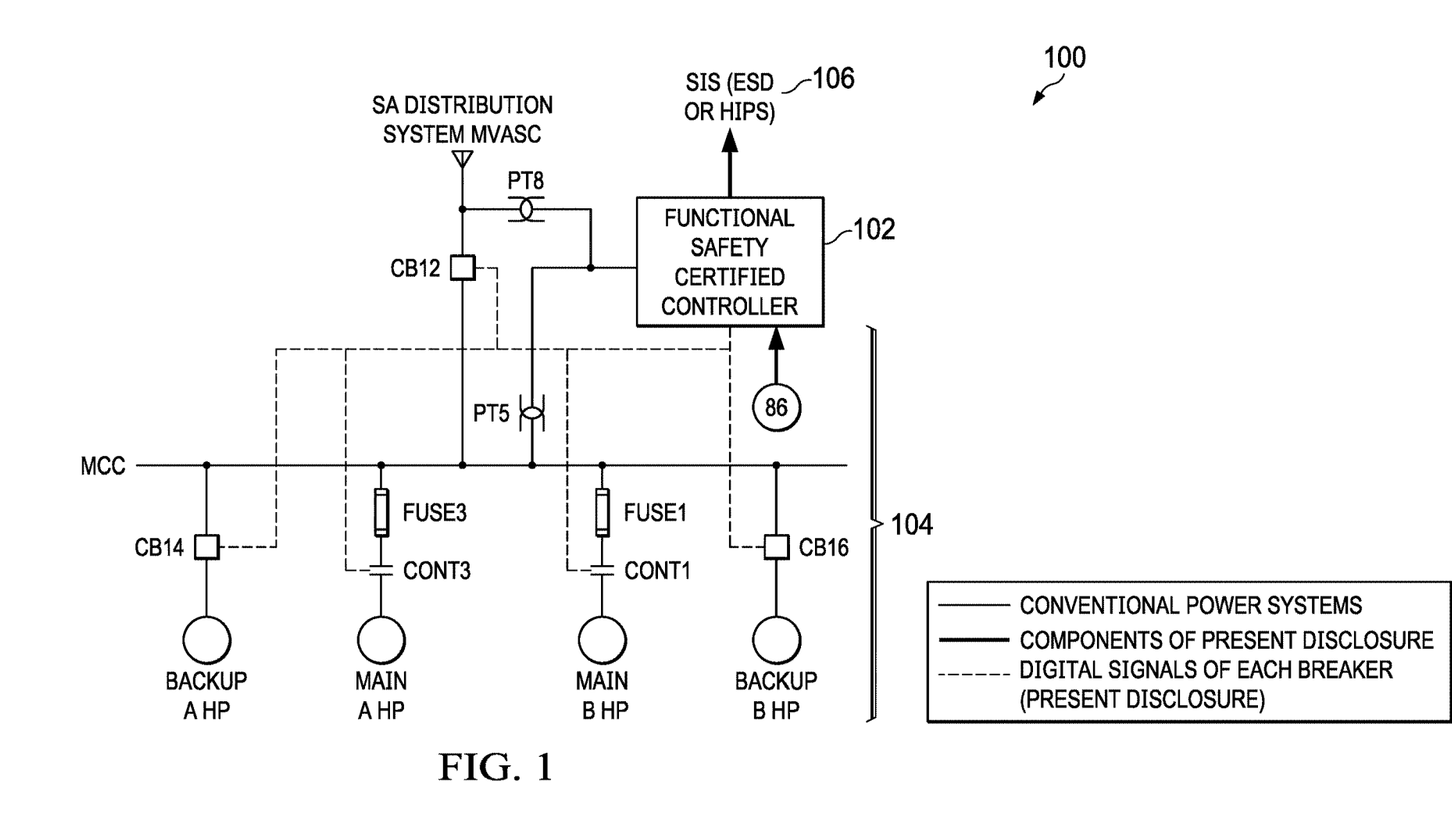
FIG. 1 is a diagram of an example of an instant power failure detection scheme for a motor control center (MCC), according to some implementations of the present disclosure.

FIG. 1 is a diagram of an example of an instant power failure detection scheme for a motor control center (MCC) 100, according to some implementations of the present disclosure. The MCC 100 is a typical MCC configuration feeding power to processes. The MCC 100 can be equipped with a functional safety certified controller. The MCC 100 can include breaker status supervision for supervising breakers and contactors in the MCC 100. The MCC 100 can include MCC healthiness supervision, such as watchdog relays and alternating current (AC) power supply supervision. The MCC 100 can include protection operation supervision logic, for example, motor feeders and motor performance. A functional safety certified controller (FSCC) 102, for example, provide customized logic processing different input sources 104 to report instant MCC power failure output status to a SIS 106, which upon confirmation of power failure initiates a sequence to cut flow mas input to the processing plant.

Figure 2:
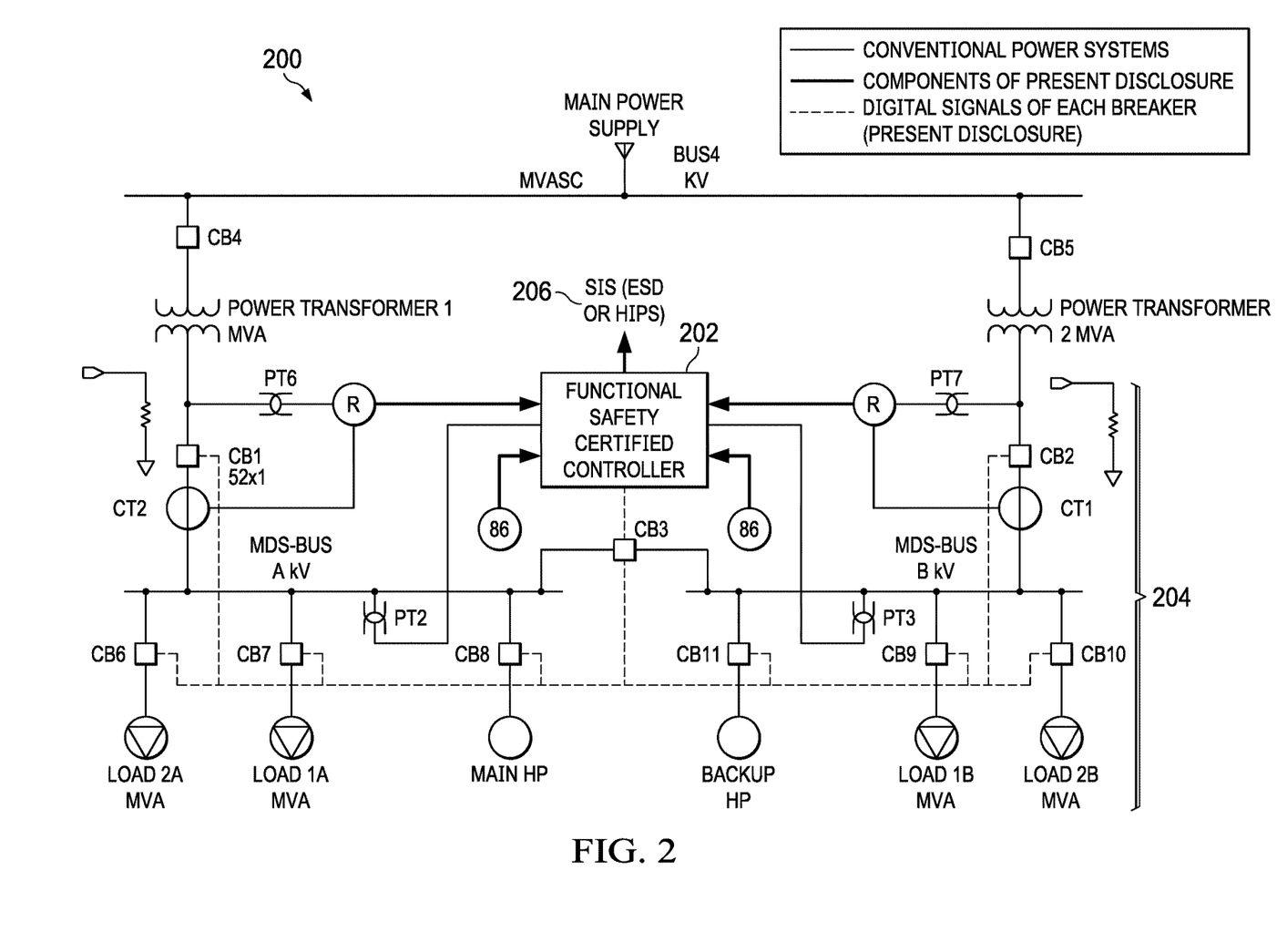
FIG. 2 is a diagram of an example of an instant power failure detection scheme for main distribution switchgears (MDS), according to some implementations of the present disclosure.

FIG. 2 is a diagram of an example of an instant power failure detection scheme for main distribution switchgears (MDS) 200, according to some implementations of the present disclosure. The MDS 200 is a typical main distribution switchgear configuration feeding power to equipment in the processing plant. The MDS 200 can be equipped with a functional safety certified controller. The MDS 200 can include MDS features for monitoring the healthiness of MDS alternating current (AC) and auxiliary direct current (DC) supplies as well as, protection and control devices associated. In addition, the MDS 200 can include MDS features for supervising breakers status and protection elements operation linked to the healthiness of power system components and sources on the MDS. The MDS 200 can provide protection operation supervision logic for critical feeders linked to the process equipment. A functional safety certified controller (FSCC) 202, for example, can provide customized logic processing different input sources 204 to report an MDS power failure status to the SIS 206, which upon confirmation of power failure initiates a sequence to cut flow mas input to the processing plant.

Figure 3:
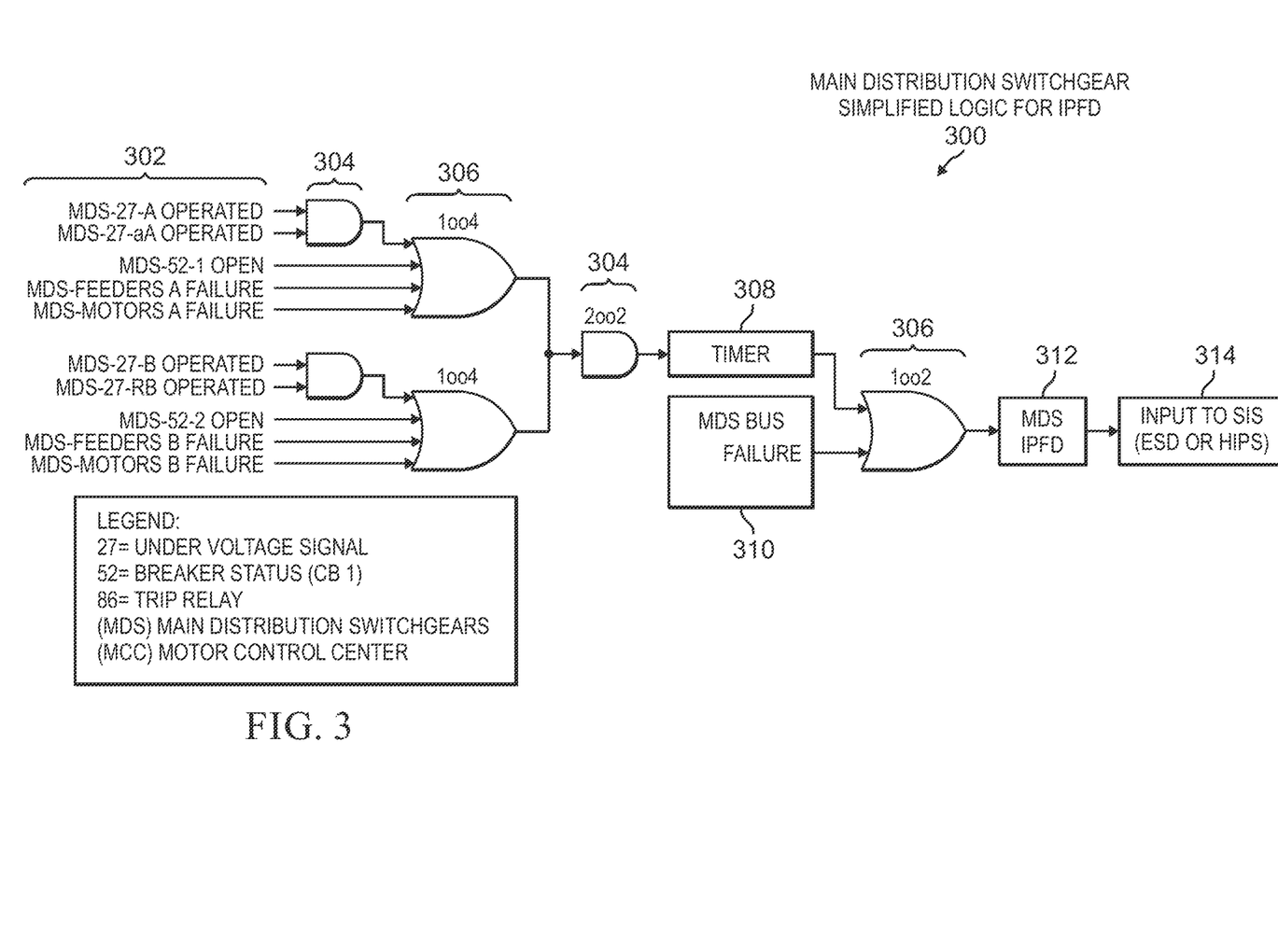
FIG. 3 is a diagram of an example of main distribution switchgear simplified logic for an instant power failure detection (IPFD) system, according to some implementations of the present disclosure.

FIG. 3 is a diagram of an example of main distribution switchgear simplified logic for an instant power failure detection (IPFD) system 300, according to some implementations of the present disclosure. The system 300 uses inputs 302 from sources that include, for example equipment failures and other signals. The inputs 302 can be used in logic that computes with other logics, for example, AND logic 304, including two out of two (2oo2) configuration, and OR logic 306, including one out of four (1oo4) configuration, and OR logic 316 including one out of two (1oo2) configuration. The system 300 includes a timer 308 and a system 310 linked to the electrical protection system. System 310 uses inputs from sources that include, for example, main bus protection system operation. Logic processed by an MDS IPFD logic processor 312 is used to produce a SIS input 314, which upon confirmation of power failure initiates a sequence to cut flow mas input to the processing plant.

Figure 4:
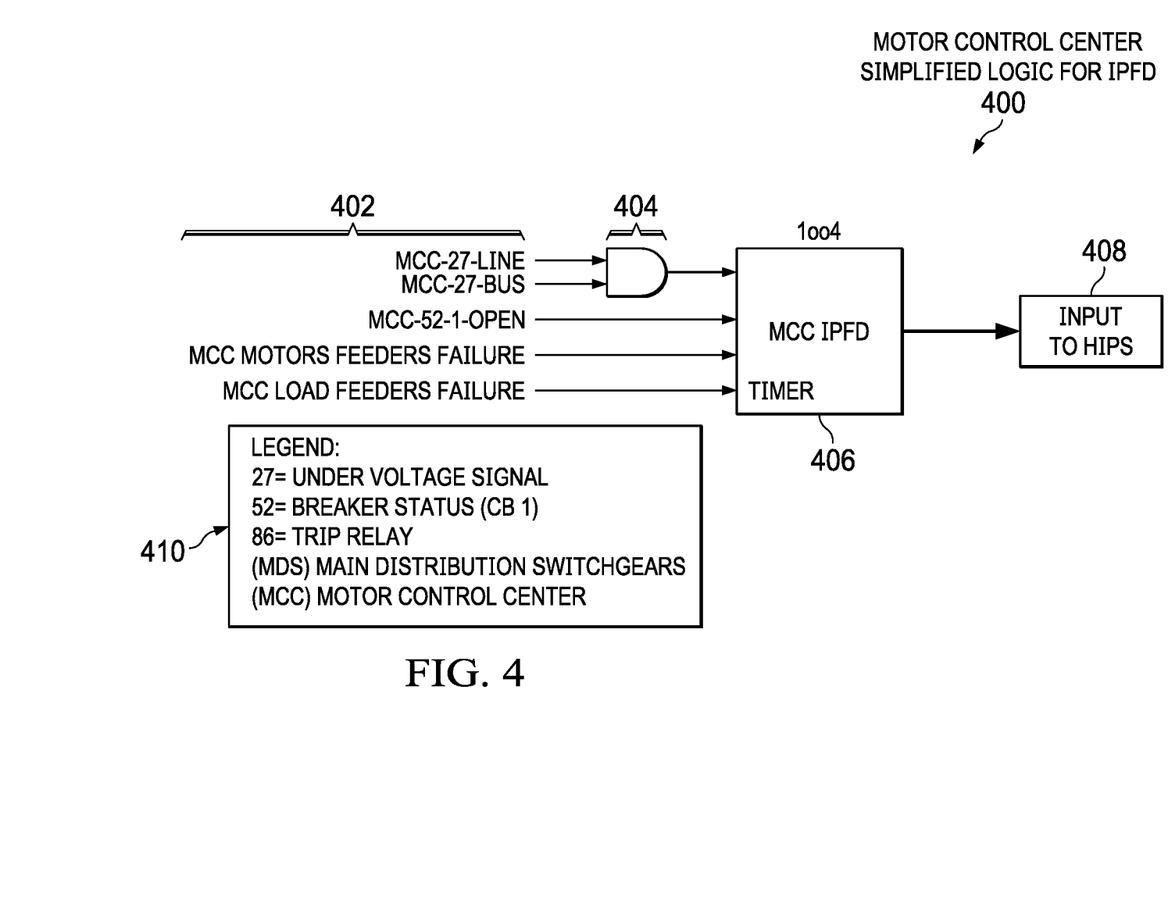
FIG. 4 is a diagram of an example of a motor control center simplified logic for IPFD, according to some implementations of the present disclosure.

FIG. 4 is a diagram of an example of a motor control center simplified logic 400 for IPFD, according to some implementations of the present disclosure. The motor control center simplified logic 400 includes inputs 402, some of which are ANDed in the logic 404. The remaining inputs and ORed inputs are processed by an MCC IPFD 406 using a customized logic in one out of four (1oo4) configuration according to system and process design, which then provides SIS input 408, which upon confirmation of power failure initiates a sequence to cut flow mas input to the processing plant. A legend 410 provides details on elements of FIG. 4.

Figure 5:
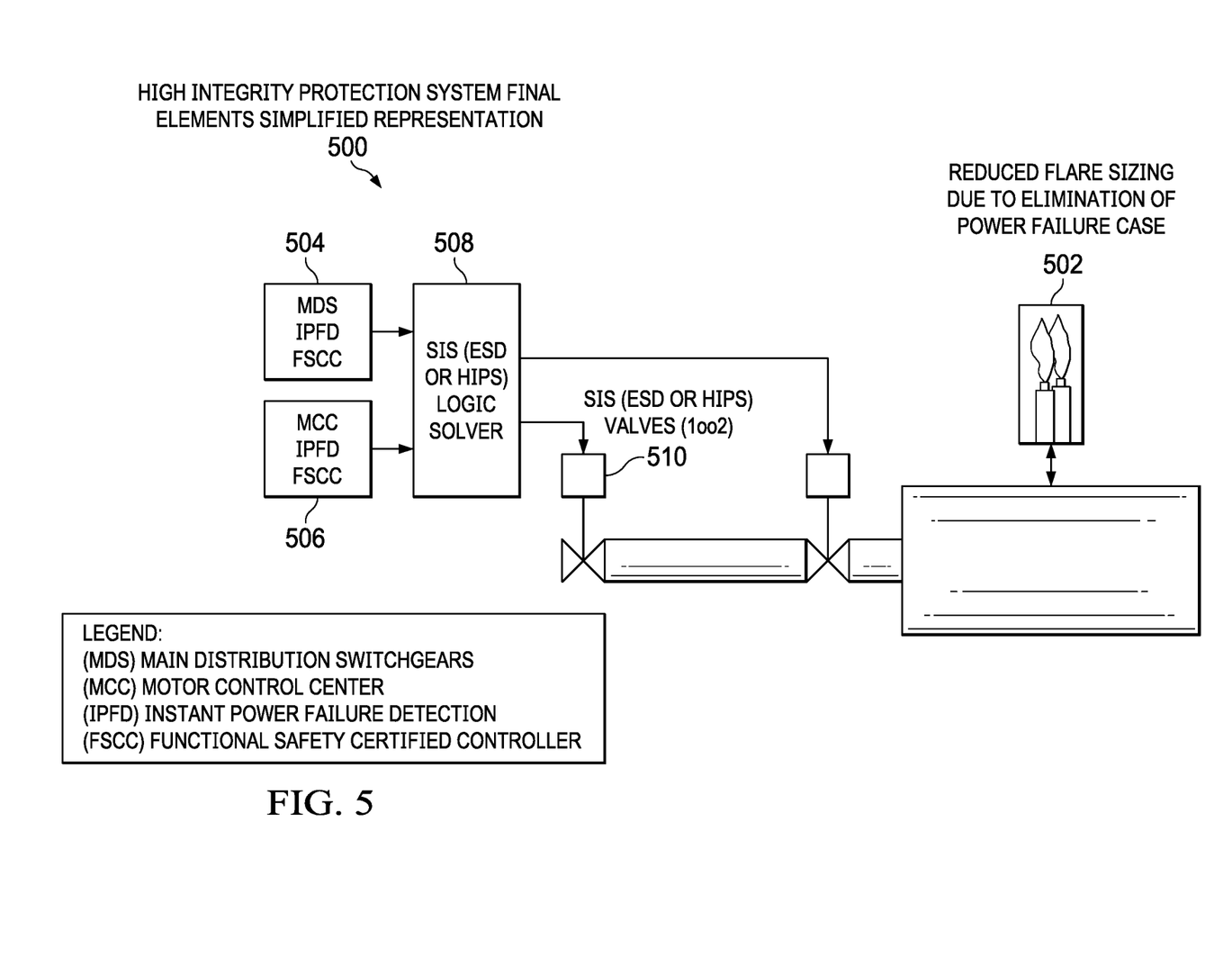
FIG. 5 is a diagram of an example of a simplified presentation of a high integrity protection system using early instant power failure detection on electrical distribution systems in a process related application to reduce the flare and relief system design capacity, according to some implementations of the present disclosure.

FIG. 5 is a diagram of an example of a simplified presentation of a safety instrumented system such as a high integrity protection system (HIPS) or an emergency shutdown system (ESD) 500, according to some implementations of the present disclosure. The system 500 can provide instant power failure detection that serves to discard it as a worst credible case from flare and disposal system design leading to a reduced flare and relief system sizing 502 due to the elimination of power failure case as a worst design credible case. An MDS IPFD FSCC 504 and an MCC IPFD FSCC 506, for example, can provide inputs to a HIPS (or ESD) logic solver 508. In some applications, the functional safety certified MDS/MCC and/or IPFD/FSCC can directly become the HIPS (or ESD) logic Solver 508. Outputs of the HIPS (or ESD) logic Solver 508 can be used in HIPS (or ESD) valves 510 using 1oo2 redundancy, which upon confirmation of power failure cut flow mas input to the process, offering robust reliability and safety availability.

Figure 6:
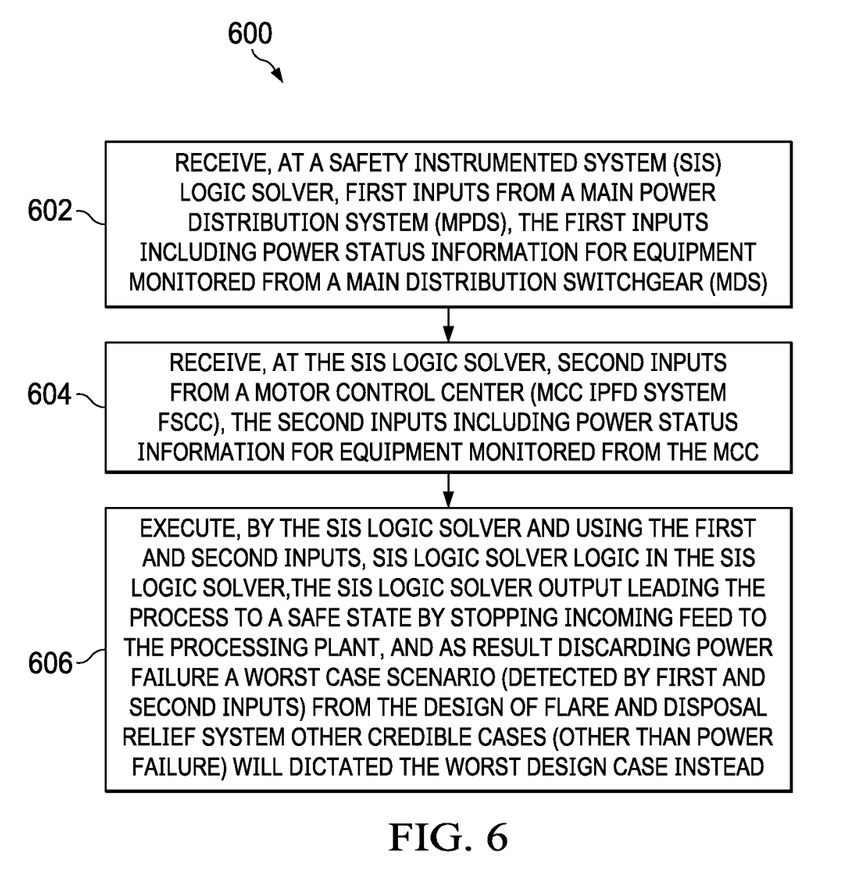
FIG. 6 is a flowchart of an example of a method for an IPFD system, according to some implementations of the present disclosure.

FIG. 6 is a flowchart of an example of a method 600 for an IPFD system, according to some implementations of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602 from sensing the main power distribution system (MPDS), first inputs are received at a safety instrumented system (SIS) logic solver. The first inputs include, for example, power status information for equipment monitored by a main distribution switchgears (MDS). The MPDS is monitored and can include an MDS instant power failure detection (IPFD) system of a functional safety capable controller (FSCC), for example. The SIS can be an emergency shutdown (ESD) system or a high integrity protection systems (HIPS) logic solver. Inputs and processing as described with reference to FIGS. 3-5 can be used. From 602, method 600 proceeds it 604

At 604, a second input is received at the SIS logic solver, from a second monitoring point of the MPDS. The second input includes, for example, power status information for equipment monitored by a motor control center (MCC). As an example, the second monitoring point of the MPDS can be an MCC IPFD system of an FSCC. Inputs and processing as described with reference to FIGS. 3-5 can be used. From 604, method 600 proceeds to 606.

At 606, SIS logic solver logic in the SIS logic solver is executed by the SIS logic solver using at least one of the first and second MPDS inputs detecting and instantly signaling the power failure, often accounted as the worst credible design case scenario for Flare and relief system design. The SIS logic solver logic generates an output signal to cut an incoming feed to processing plants, leading to discarding power failure as a worst credible design case scenario for flare and disposal relief systems. Boolean logic can be applied on received inputs to instantly detect a power failure and discard the power failure from being considered as a worst credible case scenario for flare and over pressure disposal relief systems design. The Boolean logic can be applied for reliability and safety availability or as required by a safety integrity level required by particular applications to meet industry standards. The Boolean logic can include one or more of hardware-software voting and redundancy architectures, including one out of two (1oo2) logic, two out of two (2oo2) logic, and one out of four (1oo4) logic. As an example, logic as described with reference to FIGS. 3-5 can be used. After 606, method 600 can stop.

In some implementations, method 600 further includes using outputs of the SIS logic solver to design and build electrical distribution controllers as functional safety capable devices as an additional technical feature in compliance with industry relevant safety standards, including International Electrotechnical Commission (IEC) 61511 and 61508.

In some implementations, method 600 further includes using in electrical safety applications, current non-functional safety certified controllers executing the SIS logic solver. The outputs of method 600 generated by a non-functional safety certified electrical controller can be used to seek certification of existing non-functional safety certified electrical power distribution controllers according to industry relevant safety standards and starting to use the output generated from the power distribution controllers under proven in/prior use concepts or by increasing reliability and diagnostic of existing non-functional safety certified electrical power distribution controllers to be suitable for use in functional safety applications. In some implementations, a timer can be used in an IPFD system while processing the input signals.

Figure 7:
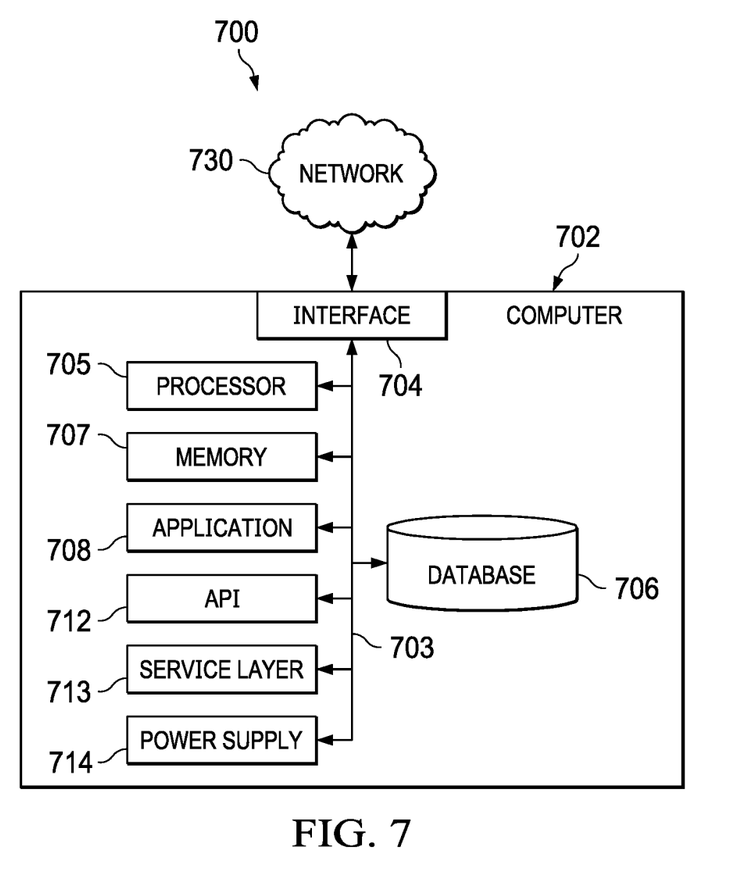
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method includes the following. First inputs are received from a first monitoring of main power distribution system (MPDS) at a safety instrumented system (SIS) logic solver. The first inputs include, for example, power status information for equipment monitored by a main distribution switchgears (MDS). A second input is received at the SIS logic solver, from a second monitoring point of the MPDS. The second input includes, for example, power status information for equipment monitored by a motor control center (MCC). SIS logic solver logic in the SIS logic solver is executed by the SIS logic solver using at least one of the first and second MPDS inputs. The SIS logic solver logic generates an output signal to cut an incoming feed to processing plants, leading to discarding power failure as a worst credible design case scenario for flare and disposal relief systems, the worst credible design case scenario caused by at least one of the first inputs and the second inputs.

The foregoing and other described implementations can each, optionally, include one or more of the following features:

A first feature, combinable with any of the following features, where the first monitoring of the MPDS is an MDS instant power failure detection (IPFD) system of a functional safety capable controller (FSCC).

A second feature, combinable with any of the previous or following features, where the second monitoring of the MPDS is an MCC IPFD system of an FSCC.

A third feature, combinable with any of the previous or following features, where the SIS is an emergency shutdown (ESD) system or high integrity protection systems (HIPS) logic solver.

A fourth feature, combinable with any of the previous or following features, the method further including applying Boolean logic on received inputs to instantly detect a power failure and discard the power failure from being considered as a worst credible case scenario for flare and over pressure disposal relief systems design.

A fifth feature, combinable with any of the previous or following features, the method further including applying the Boolean logic for reliability and safety availability or as required by a safety integrity level required by particular applications to meet industry standards.

A sixth feature, combinable with any of the previous or following features, where the Boolean logic includes one or more of hardware-software voting and redundancy architecture, including one out of two (1oo2) logic, two out of two (2oo2) logic, and one out of four (1oo4) logic.

A seventh feature, combinable with any of the previous or following features, the method further including using outputs of the SIS logic solver to design and build electrical distribution controllers as functional safety capable devices as an additional technical feature in compliance with industry relevant safety standards, including International Electrotechnical Commission (IEC) 61511 and 61508.

An eighth feature, combinable with any of the previous or following features, the method further including seeking certification of existing non-functional safety certified electrical power distribution controllers according to industry relevant safety standards and starting to use the output generated from the power distribution controllers under proven in/prior use concepts or by increasing reliability and diagnostic of existing non-functional safety certified electrical power distribution controllers to be suitable for use in functional safety applications.

A ninth feature, combinable with any of the previous or following features, the method further including using, in electrical safety applications, current functional safety certified controllers executing the SIS logic solver.

A tenth feature, combinable with any of the previous or following features, the method further including using, in an IPFD system, a timer while processing the input signals.

In a second implementation, a non-transitory, computer-readable medium stores one or more instructions executable by a computer system to perform operations including the following. First inputs are received from monitoring of the main power distribution system (MPDS) at a safety instrumented system (SIS) logic solver. The first inputs include, for example power status information for equipment monitored by a main distribution switchgears (MDS). A second input is received at the SIS logic solver, from a second monitoring of the MPDS. The second input includes, for example power status information for equipment monitored by a motor control center (MCC). SIS logic solver logic in the SIS logic solver is executed by the SIS logic solver using at least one of the first and second MPDS inputs. The SIS logic solver logic generates an output signal to cut an incoming feed to processing plants, leading to discarding power failure as a worst credible design case scenario for flare and disposal relief systems, the worst credible design case scenario caused by at least one of the first inputs and the second inputs.

The foregoing and other described implementations can each, optionally, include one or more of the following features:

A first feature, combinable with any of the following features, where the first monitoring of the MPDS is an MDS instant power failure detection (IPFD) system of a functional safety capable controller (FSCC).

A second feature, combinable with any of the previous or following features, where the second monitoring of the MPDS is an MCC IPFD system of an FSCC.

A third feature, combinable with any of the previous or following features, where the SIS is an emergency shutdown (ESD) system or high integrity protection systems (HIPS) logic solver.

A fourth feature, combinable with any of the previous or following features, the operations further including applying Boolean logic on received inputs to instantly detect a power failure and discard the power failure from being considered as a worst credible case scenario for flare and over pressure disposal relief systems design.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. First inputs are received from a monitoring of the main power distribution system (MPDS) at a safety instrumented system (SIS) logic solver. The first inputs include power status information for equipment monitored by a main distribution switchgears (MDS). A second input is received at the SIS logic solver, from a second monitoring of the MPDS. The second input includes, for example, power status information for equipment monitored by a motor control center (MCC). SIS logic solver logic in the SIS logic solver is executed by the SIS logic solver using at least one of the first and second MPDS inputs. The SIS logic solver logic generates an output signal to cut an incoming feed to processing plants, leading to discarding power failure as a worst credible design case scenario for flare and disposal relief systems, the worst credible design case scenario caused by at least one of the first inputs and the second inputs.

The foregoing and other described implementations can each, optionally, include one or more of the following features:

A first feature, combinable with any of the following features, where the first monitoring of the MPDS is an MDS instant power failure detection (IPFD) system of a functional safety capable controller (FSCC).

A second feature, combinable with any of the previous or following features, where the second monitoring of the MPDS is an MCC IPFD system of an FSCC.

A third feature, combinable with any of the previous or following features, where the SIS is an emergency shutdown (ESD) system or high integrity protection systems (HIPS) logic solver.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving, at a safety instrumented system (SIS) logic solver, first inputs from monitoring a main power distribution system (MPDS), the SIS logic solver serving processing plants that comprise at least one flare and relief system providing power failure detection and proactive actuation of safety instrumented systems, the first inputs comprising including power status information for equipment monitored by a main distribution switchgears (MDS), the MDS comprising a plurality of AND logic operators, a first AND logic operator and a second AND logic operator of the plurality of AND logic operators integrating voltage signals to generate respective partial inputs for a first OR logic operator and a second OR logic operator, respectively, the first OR logic operator and the second OR logic operator transmitting signals to a third AND logic operator of the plurality of AND logic operators, the third AND logic operator transmitting an integrated signal to a first timer;
receiving, at the SIS logic solver, second inputs from a second monitoring point of the MPDS, the second inputs comprising power status information for equipment monitored by a motor control center (MCC), the MCC comprising at least one one out of four (1oo4) logic operator; and
executing, by the SIS logic solver and using the first inputs and the second inputs, SIS logic solver logic in the SIS logic solver, the SIS logic solver logic generating an output signal to cut an incoming feed to the processing plants that is associated with a detected anomaly, wherein executing the SIS logic solver logic comprises applying Boolean logic on the first inputs and the second inputs to instantly detect a power failure, wherein the SIS logic solver comprises one or more of hardware-software voting and redundancy architecture, and wherein the Boolean logic comprises 1004 logic operating on data values of the MDS and the MCC, the data values comprising voltage signals, breaker statuses, feeder failures, and motors failures.

2. The computer-implemented method of claim 1, wherein receiving the first inputs comprises includes receiving the first inputs from an MDS instant power failure detection (IPFD) system of a first functional safety capable controller (FSCC).

3. The computer-implemented method of claim 1, wherein receiving the second inputs comprises receiving the second inputs from an MCC IPFD system of a second FSCC.

4. The computer-implemented method of claim 1, wherein the SIS logic solver is an emergency shutdown (ESD) system or a high integrity protection system (HIPS) logic solver.

5. The computer-implemented method of claim 1, further comprising applying the Boolean logic for reliability and safety availability or as defined by a safety integrity level required by particular applications to meet industry standards.

6. The computer-implemented method of claim 1, further comprising:
using, in electrical safety applications, current functional safety certified controllers executing the SIS logic solver.

7. The computer-implemented method of claim 1, further comprising:
using, in an IPFD system, a timer while processing the first inputs and the second inputs.

8. A non-transitory, computer-readable medium storing one or more instructions executable by a computer system to perform operations comprising:
receiving, at a safety instrumented system (SIS) logic solver, first inputs from monitoring a main power distribution system (MPDS), the SIS logic solver serving processing plants that comprise at least one flare and relief system providing power failure detection and proactive actuation of safety instrumented systems, the first inputs comprising power status information for equipment monitored by a main distribution switchgears (MDS), the MDS comprising a plurality of AND logic operators, a first AND logic operator and a second AND logic operator of the plurality of AND logic operators integrating voltage signals to generate respective partial inputs for a first OR logic operator and a second OR logic operator, respectively, the first OR logic operator and the second OR logic operator transmitting signals to a third AND logic operator of the plurality of AND logic operators, the third AND logic operator transmitting an integrated signal to a first timer;
receiving, at the SIS logic solver, second inputs from a second monitoring point of the MPDS, the second inputs comprising power status information for equipment monitored by a motor control center (MCC), the MCC comprising at least one one out of four (1004) logic operator; and
executing, by the SIS logic solver and using the first inputs and the second inputs, SIS logic solver logic in the SIS logic solver, the SIS logic solver logic generating an output signal to cut an incoming feed to the processing plants that is associated with a detected anomaly, wherein executing the SIS logic solver logic comprise applying Boolean logic on the first inputs and the second inputs to instantly detect a power failure, wherein the SIS logic solver comprises one or more of hardware-software voting and redundancy architecture, and wherein the Boolean logic comprises 1004 logic operating on data values of the MDS and the MCC, the data values comprising voltage signals, breaker statuses, feeder failures, and motors failures.

9. The non-transitory, computer-readable medium of claim 8, wherein receiving the first inputs comprises receiving the first inputs from an MDS instant power failure detection (IPFD) system of a first functional safety capable controller (FSCC).

10. The non-transitory, computer-readable medium of claim 8, wherein receiving the second inputs comprises receiving the second inputs from an MCC IPFD system of a second FSCC.

11. The non-transitory, computer-readable medium of claim 8, wherein the SIS logic solver is an ESD system or a HIPS logic solver.

12. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, at a safety instrumented system (SIS) logic solver, first inputs from monitoring a main power distribution system (MPDS), the SIS logic solver serving processing plants that comprise at least one flare and relief system providing power failure detection and proactive actuation of safety instrumented systems, the first inputs comprising power status information for equipment monitored by a main distribution switchgears (MDS), the MDS comprising a plurality of AND logic operators, a first AND logic operator and a second AND logic operator of the plurality of AND logic operators integrating voltage signals to generate respective partial inputs for a first OR logic operator and a second OR logic operator, respectively, the first OR logic operator and the second OR logic operator transmitting signals to a third AND logic operator of the plurality of AND logic operators, the third AND logic operator transmitting an integrated signal to a first timer;
receiving, at the SIS logic solver, second inputs from a second monitoring point of the MPDS, the second inputs comprising power status information for equipment monitored by a motor control center (MCC), the MCC comprising at least one one out of four (1004) logic operator; and
executing, by the SIS logic solver and using the first inputs and the second inputs, SIS logic solver logic in the SIS logic solver, the SIS logic solver logic generating an output signal to cut an incoming feed to the processing plants that is associated with a detected anomaly, wherein executing the SIS logic solver logic comprises applying Boolean logic on received the first inputs and the second inputs to instantly detect a power failure, wherein the SIS logic solver comprises one or more of hardware-software voting and redundancy architecture, and wherein the Boolean logic comprises 1004 logic operating on data values of the MDS and the MCC, the data values comprising voltage signals, breaker statuses, feeder failures, and motors failures.

13. The computer-implemented system of claim 12, wherein receiving the first inputs comprises receiving the first inputs from an MDS instant power failure detection (IPFD) system of a first functional safety capable controller (FSCC).

14. The computer-implemented system of claim 12, wherein receiving the second inputs comprises receiving the second inputs from an MCC IPFD system of a second FSCC.

15. The computer-implemented system of claim 12, wherein the SIS logic solver is an ESD system or a HIPS logic solver.

* * * * *

UNITED STATES PATENT AND TRADEMARK OFFICE
CERTIFICATE OF CORRECTION

PATENT NO. : 12,072,698 B2
APPLICATION NO. : 17/240753
DATED : August 27, 2024
INVENTOR(S) : Pedro Alejandro Mujica, Herman Roberto Cipriano and Ricardo Jose Guerra Castillo It is certified that error appears in the above-identified patent and that said Letters Patent is hereby corrected as shown below:

In the Claims

In Column 16, Line 40, Claim 1, please replace "comprising including" with -- comprising --.

In Column 17, Line 7, Claim 2, please replace "comprises includes" with -- comprises --.

In Column 17, Line 67, Claim 8, please replace "comprise" with -- comprises --.

In Column 18, Line 60, Claim 12, please replace "on received" with -- on --.

Signed and Sealed this
Twelfth Day of November, 2024

Katherine Kelly Vidal
*Director of the United States Patent and Trademark Office*